US008745359B2

(12) United States Patent
Nomoto

(10) Patent No.: US 8,745,359 B2
(45) Date of Patent: Jun. 3, 2014

(54) PROCESSOR FOR CONCURRENTLY EXECUTING PLURAL INSTRUCTION STREAMS

(75) Inventor: Shohei Nomoto, Tokyo (JP)

(73) Assignee: NEC Corporation, Tokyo (JP)

(*) Notice: Subject to any disclaimer, the term of this patent is extended or adjusted under 35 U.S.C. 154(b) by 952 days.

(21) Appl. No.: 12/919,448

(22) PCT Filed: Feb. 3, 2009

(86) PCT No.: PCT/JP2009/051753
§ 371 (c)(1),
(2), (4) Date: Aug. 25, 2010

(87) PCT Pub. No.: WO2009/107462
PCT Pub. Date: Sep. 3, 2009

(65) Prior Publication Data
US 2011/0010527 A1 Jan. 13, 2011

(30) Foreign Application Priority Data

Feb. 26, 2008 (JP) ................................. 2008-044274

(51) Int. Cl.
G06F 9/38 (2006.01)
(52) U.S. Cl.
USPC ............................................ 712/24; 712/206
(58) Field of Classification Search
CPC . G06F 9/3851; G06F 9/3009; G06F 9/30087; G06F 9/3838; G06F 9/38
See application file for complete search history.

(56) References Cited

U.S. PATENT DOCUMENTS 5,574,939 A * 11/1996 Keckler et al. ................... 712/24
5,787,490 A * 7/1998 Ozawa ........................... 711/173
6,170,051 B1 * 1/2001 Dowling ........................ 712/225
(Continued)

FOREIGN PATENT DOCUMENTS

JP 4-123230 A 4/1992
JP 7-121371 A 5/1995
(Continued)

OTHER PUBLICATIONS

Conte, Thomas M. etal., Instruction Fetch Mechanisms for VLIW Architectures with Compressed Encodings, 1996, IEEE pp. 201-211.*

(Continued)

Primary Examiner — Eric Coleman
(74) Attorney, Agent, or Firm — Sughrue Mion, PLLC

(57) ABSTRACT

A VLIW processor executes a very long instruction word containing a plurality of instructions, and executes a plurality of instruction streams at low cost. A processor executing a very long instruction word containing a plurality of instructions fetches concurrently the very long instruction words of up to M instruction streams, from N instruction caches including a plurality of memory banks to store the very long instruction words of the M instruction streams. The processor may set instruction priority order for each of the instruction streams, designate a memory bank to be used by each of the instruction streams from the memory banks based on bank number information, which indicates a number of memory banks each instruction stream uses, and an instruction address of each of the instruction streams, determine a memory bank to be used in descending priority order based on the instruction stream priority order when a plurality of instruction streams are to use a same memory bank, and supply an instruction address of a corresponding instruction stream to the determined memory bank.

19 Claims, 13 Drawing Sheets

(56) References Cited

U.S. PATENT DOCUMENTS

| | | | |
|---|---|---|---|
| 6,549,987 B1* | 4/2003 | Rappoport et al. | 711/128 |
| 6,898,694 B2* | 5/2005 | Kottapalli et al. | 712/207 |
| 6,968,546 B2* | 11/2005 | Lueh | 717/158 |
| 7,096,343 B1* | 8/2006 | Berenbaum et al. | 712/24 |
| 7,490,230 B2* | 2/2009 | Jensen et al. | 712/245 |
| 7,664,929 B2* | 2/2010 | Pinto et al. | 712/24 |
| 2002/0129227 A1* | 9/2002 | Arakawa | 712/228 |

FOREIGN PATENT DOCUMENTS

| | | | |
|---|---|---|---|
| JP | 7-191847 A | 7/1995 | |
| JP | 9-190348 A | 7/1997 | |
| JP | 10-116191 A | 5/1998 | |
| JP | 10-124316 A | 5/1998 | |
| JP | 2000222208 A | 8/2000 | |
| JP | 2000259498 A | 9/2000 | |
| JP | 2001306324 A | 11/2001 | |
| JP | 2006343872 A | 12/2006 | |
| JP | 2007102792 A | 4/2007 | |
| WO | 9730395 A | 8/1997 | |

OTHER PUBLICATIONS

International Search Report for PCT/JP2009/051753 mailed May 26, 2009.

T Kokuryo et al., "A Multi-Threaded VLIW Processor Architecture", IPSJ SIG Notes. vol. 93. No. 91. Oct. 21, 1993, pp. 17-24.

* cited by examiner

| PRIORITY ORDER | | BANK 1 | BANK 2 | BANK 3 | BANK 4 | BANK NUMBER INFORMATION |
|---|---|---|---|---|---|---|
| LOW | INSTRUCTION 1 | IA1 → | → | | | 3 |
| | INSTRUCTION 2 | | IA2 → | → | | 2 |
| | INSTRUCTION 3 | | | IA3 | | 1 |
| HIGH | INSTRCUTION 4 | IA4 | | | | 1 |
| | SELECTION RESULT | IA4 | IA2 | IA2+α | IA3 | |

*IA = INSTRCUTION ADDRESS

FIG. 12

| | BANK 1 | BANK 2 | BANK 3 | BANK 4 |
|---|---|---|---|---|
| CYCLE 1 | IA1 → | | | |
| CYCLE 2 | → | | IA2 → | |
| CYCLE 3 | | IA3 | | |
| CYCLE 4 | | | IA4 → | |
| CYCLE 5 | IB1 → | | | |
| CYCLE 6 | → | | IB2 → | |
| CYCLE 7 | | IB3 | | |
| CYCLE 8 | | | IB4 → | |

PROCESSOR FOR CONCURRENTLY EXECUTING PLURAL INSTRUCTION STREAMS

This application is the National Phase of PCT/JP2009/051753, filed Feb. 3, 2009, which is based upon and claims the benefit of priority from Japanese patent application No. 2008-044274 filed on Feb. 26, 2008, the disclosure of which is incorporated herein in its entirety by reference.

TECHNICAL FIELD

The present invention relates to a processor, method and program for concurrently executing instruction streams.

BACKGROUND ART

A VLIW processor which concurrently executes a VLIW (very long instruction word) including a plurality of instruction words (e.g., operation, load) has been proposed. The VLIW processor analyzes order relation and data dependency relation between instructions, and extracts instructions which are possible to be simultaneously executed. Thus, performance improvement due to simultaneous execution of instructions has been achieved without the runtime overhead.

However, in one program (instruction stream), the number of instructions which can be concurrently executed has a limitation; averagely 2 or 3 instructions per cycle is considered to be the limitation; and further performance improvement has been difficult.

Thus, in recent years, a VLIW processor which achieves further performance improvement by executing concurrently a plurality of instruction streams has been realized (see PL 1, for example). The processor described in PL 1, as shown in FIG. 2, requires instruction caches 1 to M, each of which stores an instruction for each instruction stream, to concurrently execute M instruction streams (instruction addresses 1 to M), instruction buffers 1 to M which temporarily store fetched instructions, and an instruction selector which extracts and selects instructions to be concurrently executed from the instruction streams. In addition, a program counter (PC) which controls an instruction sequence for each instruction stream will be required (not illustrated in FIG. 2). The instruction addresses 1 to M are provided from the PCs. An explanation will be given on the case in which the processor executes M instruction streams for executing the very long instruction word containing up to K instructions.

In such a case, according to PL 1, when the instructions fetched by the respective instruction streams are dividable, the M instructions are divided, and instructions are selected from the instruction streams and provided for computing units so that the priority of the instruction streams and the number of the simultaneously executable computing units may become the maximum (i.e., K). Therefore, the number of instructions concurrently executed are increased to improve the Performance.

A processor described in NPL 1 requires, as shown in FIG. 3, M program counters (PCs) which provide respective instruction streams (instruction addresses 1 to M), an instruction cache, and an address selector. It should be noted that the program counters are not illustrated in FIG. 3.

The program counters control the instruction sequence. One instruction cache stores M instruction-stream instructions. The address selector, based on instruction stream control information, selects an address designated by the M PCs, and supplies the address to the instruction cache.

According to the processor, in one instruction stream, if a stall is occurred owing to cache failure, the address selector selects and executes an instruction address designated by a PC corresponding to a different instruction stream, to minimize the performance degradation due to the stall.

CITATION LIST

Patent Literature

{PL 1} JP-A-2001-306324

Non-Patent Literature

{NPL 1} "A Multi-Threaded VLIW Processor Architecture", IPSJ SIG Notes, Vol. 93, No. 91 (Oct. 21, 1993), pp. 17-24.

SUMMARY OF INVENTION

Technical Problem

As described above, the processor described in PL 1 achieves the high performance by simultaneously fetching instructions of a plurality of the instruction streams and selecting concurrently executable instructions from the instruction streams. However, a large amount of hardware is required to realize the configuration of PL 1. Requirement of the large amount of hardware will be contrary to the purpose of achieving the high performance with low-cost hardware. Specifically, hardware cost to provide M instruction memories will come to issue.

In general, an instruction cache includes L memories to store K instructions and cache tags which includes logical information thereof, and especially, the instruction memories which require a large hardware cost becomes a problem. According to the technique described in PL 1, an instruction memory includes L memory banks for fetching concurrently up to K instructions. Thus, up to M×L 1-Read/1-Write memory banks are needed. In addition, M sets of tags used for caching and selectors thereof are necessary.

As above, if a processor, executing a plurality of instruction streams, is required to be configured with limited hardware size such as a low-cost system or embedded image processing, realizing the processor which executes the plurality of instruction streams by the method of LP 1 may be said to be difficult.

Since the processor described in NPL 1 can be realized by one instruction cache, the issue on the hardware size described above may be solved. However, as an instruction address is selected from different one instruction stream for every one cycle and supplied to the instruction cache, there may be a case in which a band width of instruction fetching cannot be utilized effectively, resulting in deterioration of the performance.

For example, assume that a case in which it is possible to fetch up to 4 instructions per cycle using an instruction bank including 4 memory banks, and assume that the instruction counts in an instruction sequence executed by an instruction stream A are 3, 2, 1, and 2, and the instruction counts in an instruction sequence executed by an instruction stream B are 1, 2, 3, and 2. In such case, according to NPL 1, because the instruction streams A and B are time-divisionally switched, 8 cycles are necessary to finalize the instruction fetch for both instruction streams. In addition, calculating the instruction counts fetched in one cycle results in 2 instructions per cycle.

That is, in the example, though 4 instructions per cycle can be fetched at a maximum, merely the half of the performance can be used.

Therefore, an exemplary object of the invention is to allow execution of a plurality of instruction streams by attaching a small amount of hardware to a processor which executes a single instruction stream, and to provide a processor, method and program for executing the plurality of instruction streams at low cost optimizing hardware performance by effectively utilizing a band width of instruction fetching in the processor at a maximum.

Solution to Problem

According to a first aspect of the invention, a processor executing a very long instruction word containing a plurality of instructions, including an address supply unit configured, when the processor fetches concurrently the very long instruction words of up to M instruction streams, from N instruction caches including a plurality of memory banks to store the very long instruction words of the M instruction streams, to set instruction priority order for each of the instruction streams, designate a memory bank to be used by each of the instruction streams from the memory banks based on bank number information, which indicates a number of memory banks each instruction stream uses, and an instruction address of each of the instruction streams, determine a memory bank to be used in descending priority order based on the instruction stream priority order when a plurality of instruction streams are to use a same memory bank and supply an instruction address of a corresponding instruction stream to the determined memory bank is provided.

According to a second aspect of the invention, a method of executing a very long instruction word containing a plurality of instructions using a processor, when fetching concurrently the very long instruction words of up to M instruction streams, from N instruction caches including a plurality of memory banks to store the very long instruction words of the M instruction streams, the method including setting instruction priority order for each of the instruction streams, designating a memory bank to be used by each of the instruction streams from the memory banks based on bank number information, which indicates a number of memory banks each instruction stream uses, and an instruction address of each of the instruction streams, determining a memory bank to be used in descending priority order based on the instruction stream priority order when a plurality of instruction streams are to use a same memory bank, and supplying an instruction address of a corresponding instruction stream to the determined memory bank is provided.

According to a third aspect of the invention, a program for causing a computer to function as a processor executing a very long instruction word containing a plurality of instructions, the program causes the computer, when fetching concurrently the very long instruction words of up to M instruction streams, from N instruction caches including a plurality of memory banks to store the very long instruction words of the M instruction streams, the processor further includes an instruction supply unit configured to set instruction priority order for each of the instruction streams, designate a memory bank to be used by each of the instruction streams from the memory banks based on bank number information, which indicates a number of memory banks each instruction stream uses, and an instruction address of each of the instruction streams, determine a memory bank to be used in descending priority order based on the instruction stream priority order when a plurality of instruction streams are to use a same memory bank, and supply an instruction address of a corresponding instruction stream to the determined memory bank is provided.

Advantageous Effects of Invention

According to the invention, since a memory bank used by each instruction stream is designated and instruction fetching from a plurality of instruction streams is decided so that the number of memory banks to be used becomes a maximum, execution of the plurality of instruction streams is allowed by attaching a small amount of hardware to a processor which executes a single instruction stream, and hardware performance is optimized and performance improvement for the entire processor can be achieved by effectively utilizing a band width of instruction fetching in the processor at a maximum.

BRIEF DESCRIPTION OF DRAWINGS

FIG. 12 is a cycle chart according to a case in which processing is executed at the arrangement of the very long instruction word shown in FIG. 11.

DESCRIPTION OF EMBODIMENTS

Hereinafter, one best exemplary embodiment to implement the invention will be described in detail with reference to the drawings.

Next, an exemplary embodiment of the invention will be described in detail with reference to the drawings.

It should be noted that exemplary embodiments of the present invention are not limited in any way to the exemplary embodiments and examples described below, and can be embodied in various forms within the scope of the invention. An instruction stream utilized herein indicates a sequence of functional units described in a program. Each instruction stream corresponds to a different sequence. In addition, the instruction stream may be replaced by another term such as a thread, process, or task, and the difference between the terms will not narrow the scope of the invention.

Figure 1:
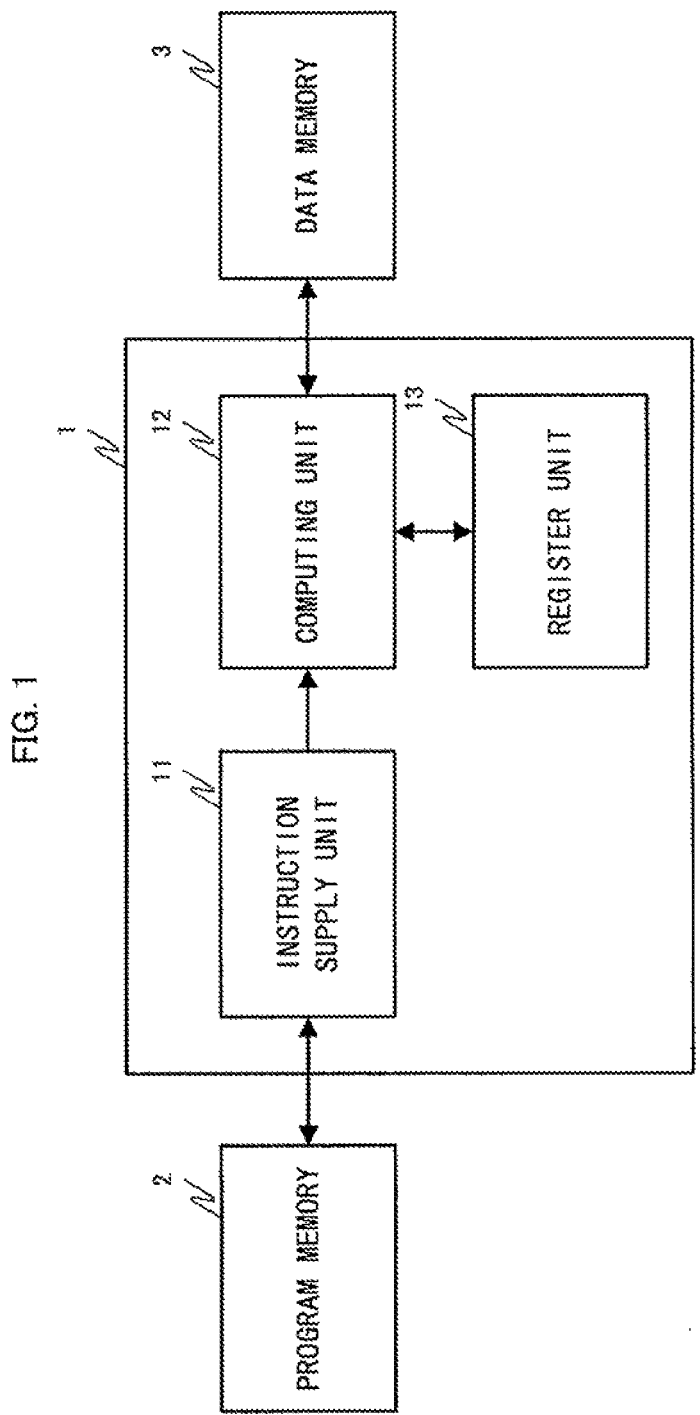
FIG. 1 is a diagram showing a basic configuration of an exemplary embodiment of the invention.
Figure 2:
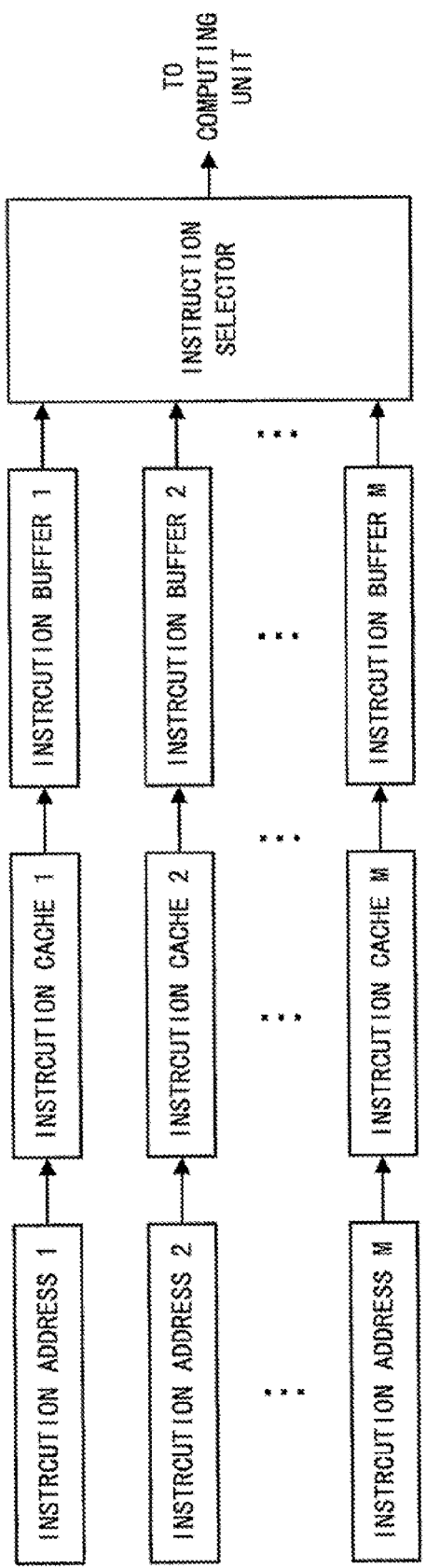
FIG. 2 is a block diagram showing the entire configuration of the embodiment of PL 1.
Figure 3:
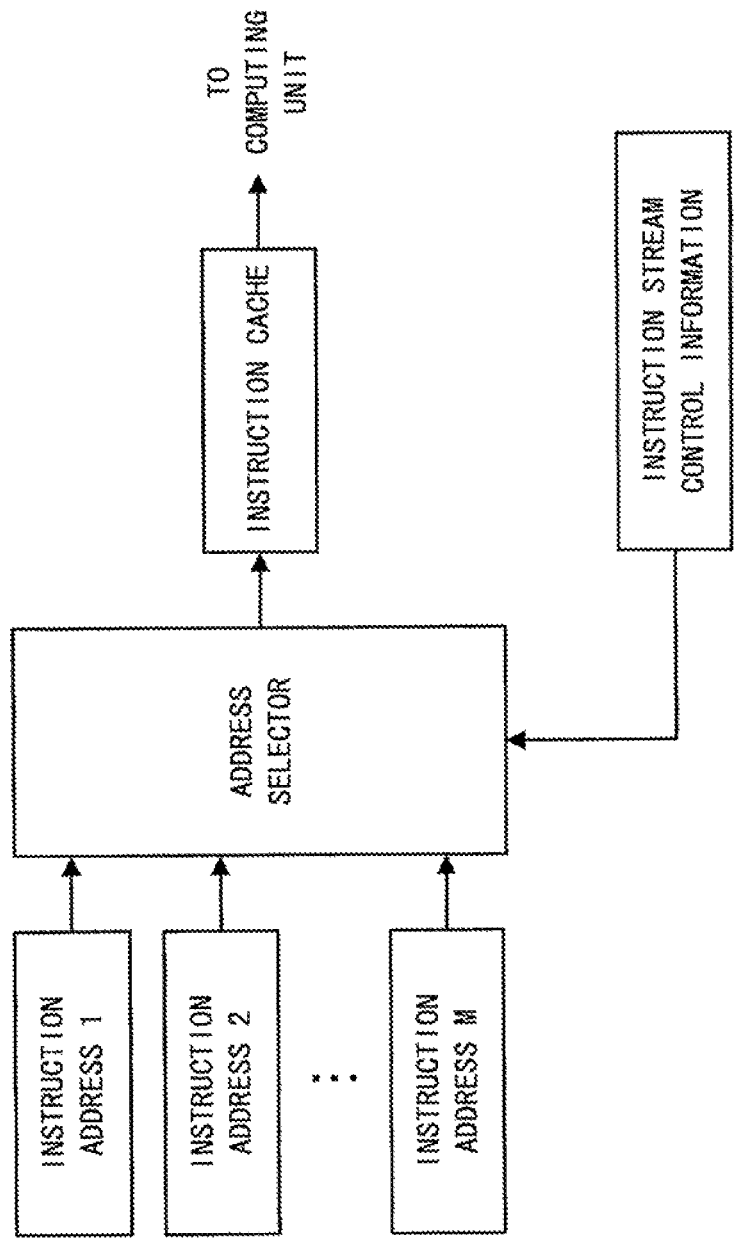
FIG. 3 is a block diagram showing the entire configuration of the embodiment of NPL 1.

FIG. 1 is a diagram showing a basic configuration of an exemplary embodiment of the present invention. According to the exemplary embodiment, a processor 1, a program memory 2, and a data memory 3 are provided. The processor 1 includes an instruction supply unit 11, a computing unit 12, and a register unit 13.

The processor 1 executes a very long instruction word containing a plurality of instructions, and executes the very long instruction words of M (≥2) instruction streams. The program memory 2 functions as a memory which stores a program. The data memory 3 functions as a memory which stores data necessary for the processor 1 to execute computing processing.

The instruction supply unit 11 functions as a unit to supply an instruction to the computing unit 12. The computing unit 12 executes computing processing in accordance with the instruction supplied from the instruction supply unit 11. The resister unit 13 functions as a storage element to be used to hold computing or execution state.

Figure 4:
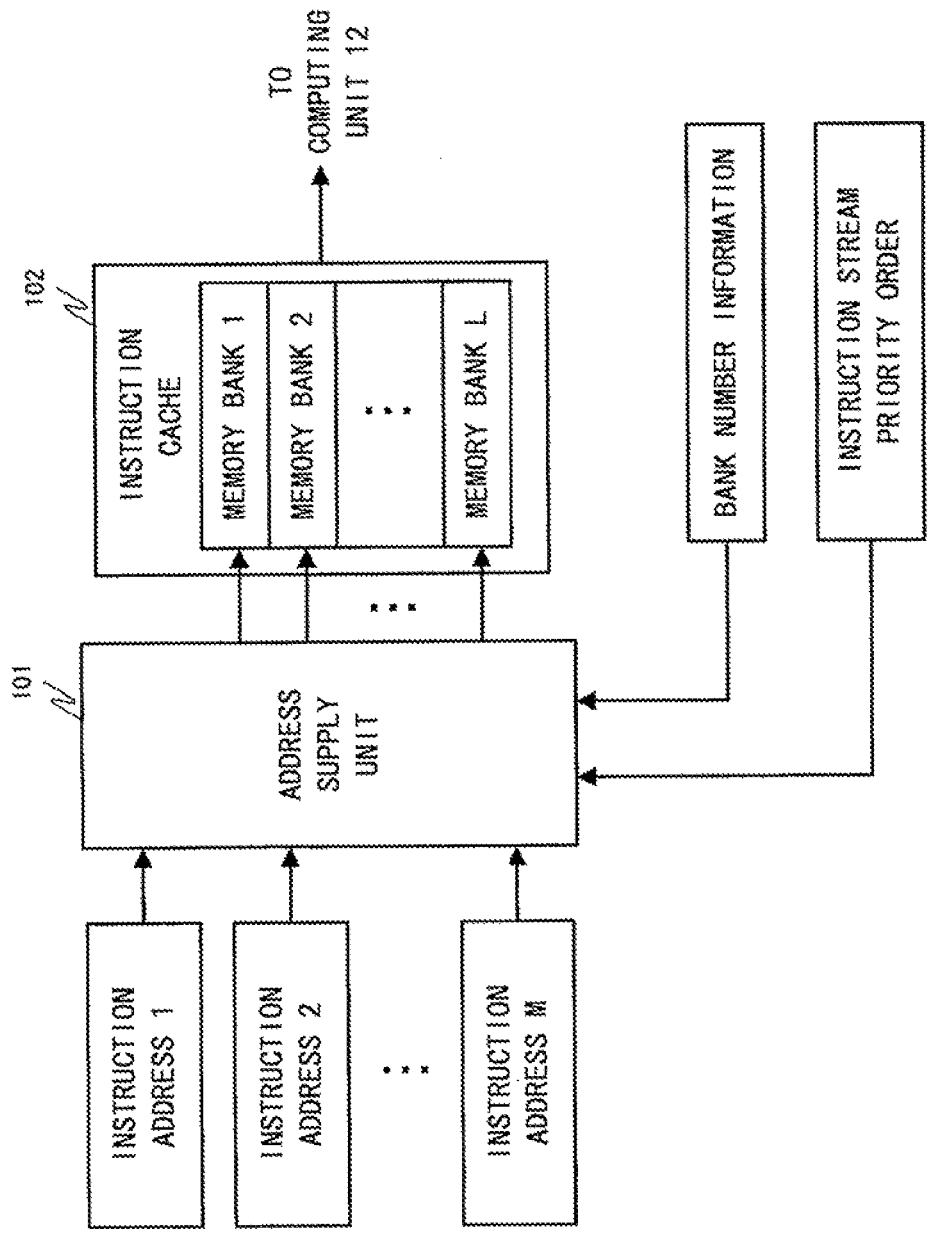
FIG. 4 is a block diagram showing an entire configuration according to an exemplary embodiment of the invention.

FIG. 4 is a block diagram showing a configuration of the instruction supply unit 11 and is a schematic diagram of a processor which executes a very long instruction word containing a plurality of instructions and executes the very long instruction words of M (≥2) instruction streams.

The instruction supply unit 11 includes an instruction addresses (instruction addresses 1 to M), memory banks (memory banks 1 to L) (L≥2), an address supply unit 101, an instruction cache 102, bank number information, and instruction stream priority order.

The instruction addresses 1 to M are instruction addresses to be supplied for the respective instruction streams. The memory banks 1 to L (L≥1) function as memory banks to store the very long instruction word of the instruction streams. The instruction cache 102 manages data in the multi-bank memory. The bank number information contains information indicating the number of the memory banks utilized by the respective instruction streams. The instruction priority order contains information of priority order of the instruction streams to be executed.

The address supply unit 101 designates memory banks to be utilized by the respective instruction streams based on the instruction addresses 1 to M and the bank number information; and when a plurality of instruction streams utilize the same memory bank, supplies an instruction address of an instruction stream having the higher priority order to the corresponding memory bank based on the instruction priority order.

Hereinafter, implementation of the bank number information supplied to the address supply unit 101 will be described in detail. It should be noted that various implementation methods are possible for acquiring, before fetching a very long instruction word, information of the number of banks to be used by the very long instruction word. An example thereof will be cited hereinafter; however, exemplary embodiments of the invention will not be limited in any way to the example described below and various implementation may be possible within the scope of the technical idea of the invention.

By way of example of implementation to acquire the bank number information, firstly, implementation (herein after this implementation will be referred to as A1), in which the number of banks to store the very long instruction words of the respective instruction streams are fixed, is possible.

According to implementation A1, for each instruction stream, a register is provided to store the number of memory banks for storing a very long instruction word to be fetched. Thus, the address supply unit 101 utilizes the register as the memory bank number information. A value to be set in the register is controlled by a control signal from the outside of the processor, or an instruction to set or change the register.

Next, another implementation (hereinafter, this implementation will be referred to as A2) in which a dedicated memory to store the bank number information for each instruction stream is provided is possible.

According to implementation A2, the memory is referred at an instruction address of each instruction stream, and stores information on how many memory banks will be used by a very long instruction word, which is to be fetched next by the instruction stream. In addition, implementation in which contents of the memory is set before the program activation, or another implementation in which the contents of the memory is updated as a cache may be possible. When being implemented as a cache, by using cache controlling mechanism of the instruction cache 102 shown in FIG. 4, implementation which suppresses necessary hardware cost is also possible.

Figures 5, 6:
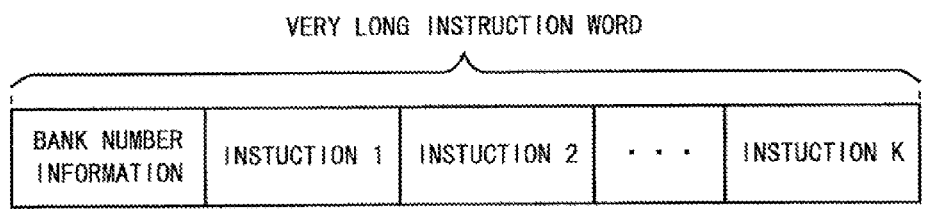
FIG. 5 is a diagram showing a configuration of a very long instruction word.
FIG. 6 is an arrangement plan of the very long instruction word in memory banks.

Then, as shown in FIG. 5, such implementation (hereinafter, this implementation will be referred to as A3) is also possible that a very long instruction word contains up to K instructions and the number of memory banks used in the next cycle of instruction fetching, and the information contained in the very long instruction word fetched at the previous cycle is used as the bank number information. In this case, the number of instructions contained in the very long instruction word may be fixed or changeable.

According to implementation A3, when fetching the first very long instruction word in an instruction stream, the bank number information is unknown. Therefore, when fetching the first very long instruction word in an instruction stream, a previously decided value is used as the bank number information; or alternatively, a register to supply the bank number information prior to the first instruction fetch in the instruction stream is provided, and the information in the register is used as the bank number information. The resister can be implemented in such a manner that the register is set based on a control signal from the outside of the processor, or an instruction to set or change the register.

In addition, according to the implementation of implementation A3, if a very long instruction word contains a branch instruction, it may be necessary to provide two items of bank number information corresponding to two patterns in which the branch is true and false, respectively. Therefore, such implementation is possible that the two items of the bank number information for the cases in which the branch is true and false are contained in the very long instruction word as a part thereof. For each instruction stream, two registers for storing two items of bank number information are provided, and in the next cycle of the branch instruction fetching, the bank number information corresponding to the case in which the branch is false is used, and when the branch in the branch instruction is true, the bank number information corresponding to the case in which the branch is true is used. In addition, such implementation is possible that an item of the bank number information corresponding to one of the cases that the branch is true and false is fixed, and the other item is made to be a part of the very long instruction. Such implementation also is possible that the fixed number is changed in accordance with a control signal from the outside of the processor, or an instruction for setting or changing.

Hereinafter, implementation of the instruction stream priority order which is supplied to the address supply unit 101 will be described in detail. Various implementation is possible as implementation for setting the instruction stream priority order. Hereinafter, an example will be cited; however, the exemplary embodiments of the invention will not be limited in any way to the example described below and various methods are conceivable within the scope of the technical idea of the present invention.

By way of example to implement the instruction stream priority order, firstly, such implementation (hereinafter, this implementation is referred to as B1) that the instruction priority order for each instruction stream is fixed is possible.

According to implementation B1, a register which stores the priority order is provided, and the register is utilized as the instruction stream priority order. Such implementation is possible that a value to be set in the register is controlled based on a control signal from the outside of the processor, an instruction to set or change the register, or an instruction stream priority order flag which is provided as a partial field of the very long instruction word fetched in the previous cycle. By way of example to fix the instruction stream priority order, such implementation is possible that, when two instruction streams are given, the streams are classified into a main instruction stream and a sub instruction stream, and heavy-load processing is allocated to the main instruction stream.

Next, a round-robin method in which instruction streams to receive higher priority order are sequentially changed is possible (hereinafter, this implementation is referred to as B2).

Implementation B2 can be realized with a pointer which indicates an instruction stream having the highest priority order and a rule to determine an instruction stream having lower priority order. As a simple one of the rule, such a method is possible that the instruction streams are aligned, and along one instruction stream direction of an instruction stream having higher priority order, the priority order is sequentially decreased. In addition, such implementation that a priority order pointer is provided as a partial field of the very long instruction word fetched in the previous cycle, and in place of the pointer, the priority order pointer is used to designate an instruction stream having the highest priority is possible.

Next, such implementation (hereinafter, this implementation is referred to as B3) is possible that, for each instruction stream, the instruction stream priority order is determined based on the number of times an instruction in the instruction stream is fetched or not fetched.

As implementation B3, for example, such implementation is possible that a counter for counting the number of times an instruction is not fetched is provided for each instruction stream, and priority is sequentially allocated in descending order of the value of the counter. Moreover, implementation that is a combination of implementation B1, B2 and B3 is possible. For example, the priority order of two instruction streams is fixed, higher priority is allocated to one instruction stream, and merely when the count value, which is the counted number of times the instructions in the other instruction stream are not fetched, exceeds a predetermined value, higher priority is allocated to the instruction stream having lower priority order. In addition, such implementation is possible that an instruction stream accepting the highest priority order in the round robin method is set as the instruction stream having the largest number of the times the instructions are not fetched. Various combinations other than those above are conceivable.

Description of Operation

Hereinafter, using a specific example, operation of instruction fetching for a plurality of instruction streams according to the invention will be described in detail. In the specific example used herein, it is assumed that the number of instruction streams M to be executed is 4, the maximum instruction number K contained in a very large instruction word is 4, the number of memory banks L is 4, the number of instruction cache N is 1, instruction addresses for respective instruction streams correspond to LA1, LA2, LA3, and LA4, bank number information for respective instruction streams correspond to 3, 2, 1, and 1, and for instruction stream priority order, the priority order of the instruction stream 2 is the highest, and the priority order is decreased in the order of the instruction streams 3, 4, and 1. With reference to the example, the operation flow of the present invention will be explained in detail. It should be noted that, in practical use, the above described parameters may be set arbitrarily.

Figure 7:
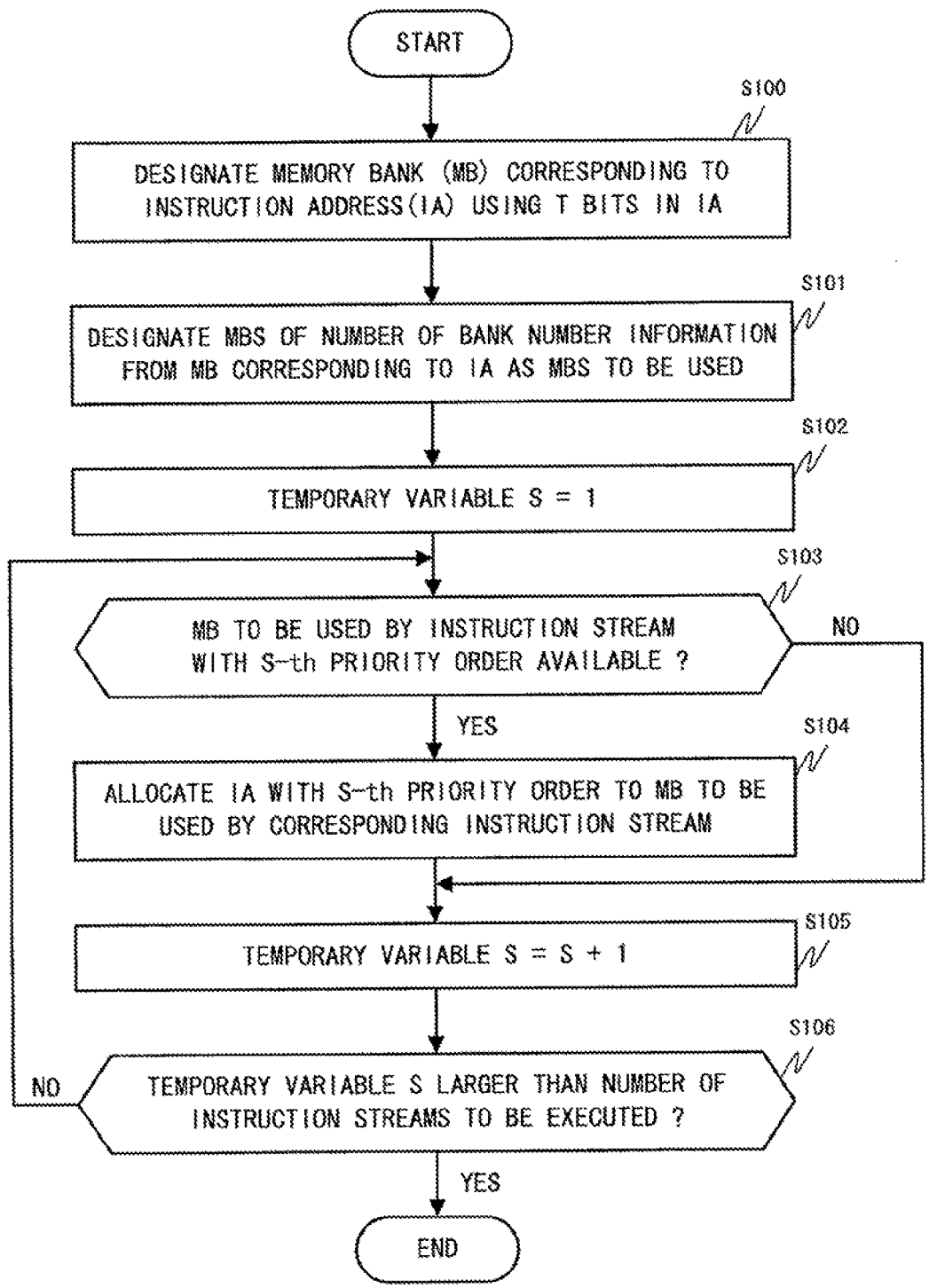
FIG. 7 is a flowchart showing an operation according to a exemplary embodiment of the invention.

FIG. 6 shows the above described parameters for the respective instruction streams and a selection result of the address supply unit 101 for each memory bank. The operation flow by the address supply unit 101 is shown in FIG. 7. In the present exemplary embodiment, the operation shown in the flowchart is realized by the hardware; however, the operation may be realized by means of software with the CPU. Moreover, the operation may be realized by cooperation between hardware and software.

Hereinafter, operation of instruction fetching for a plurality of instruction streams according to the invention will be described in detail.

First, for each instruction stream, using T bits in an instruction address (IA) of each instruction stream, a memory bank (MB) to store the instruction corresponding to the instruction address is designated from all the MBs (step S100). Here, bits in arbitrary location in the instruction address may be used as the T bits; however, the lowest T bits in the instruction address is used in general. For example, in the case of parameter setting shown in FIG. 6, using the lowest 2 bits in the instruction address, it is determined from which of the 4 memory banks instruction fetching is started.

Next, for each instruction stream, based on a memory bank location designated in step S100 and the bank number information given for each instruction stream, memory banks to be used by each instruction stream are specified. For each instruction stream, a certain number of memory banks from the memory bank location determined in step S100 are specified to be used by the instruction stream; and the number of the memory banks to be specified is indicated by the "memory bank number" (step S101).

The manner to count the number of the memory banks may be arbitrarily set; however, the memory banks are sequentially counted in one direction in general.

For example, when the parameters shown in FIG. 6 are set, the memory banks are sequentially counted in clockwise direction (bank 1→bank 4) next to the next. For the instruction stream 1, since the memory bank designated by the instruction address corresponds to the bank 1 and the bank number information indicates 3, bank 1 to bank 3, that is the third bank if counting is started from the bank 1 in the clockwise direction, are specified as the memory banks to be used by the instruction stream 1.

Subsequently, from S102 to S106 are processing to be sequentially executed in descending order of the instruction stream priority order. Sequential operation using a temporary variable S will be described herein to simplify the explanation; however, the operation need not necessarily be executed sequentially. With the real hardware, a plurality of instruction streams may simultaneously executed using equivalent circuits.

Firstly, "1" is set as the temporary variable S which indicates priority order of an instruction stream (step S102). The instruction stream with the highest priority order is indicated by 1 herein, however, another indication may be employed on condition that the equivalent operation to the operation shown in FIG. 7 is possible.

Next, it is determined whether a memory bank to be used by the instruction stream with S-th priority order indicated by the instruction stream priority order is already used by another instruction stream and is unavailable (step S103). When the memory bank to be used by the instruction stream with S-th priority order is available, processing of step S104 is executed. On the other hand, when the memory bank is unavailable, processing of step S105 is executed.

An instruction address (IA) of the instruction stream with S-th priority order is supplied to the memory bank which the instruction stream uses (step S104). Here, the instruction address to be supplied to the memory bank may be a part of the instruction address or may be an address calculated from all or part of the instruction address. For example, R bits higher than the lowest T bits in the instruction address are extracted and the R bits are supplied to the memory bank designated by the lowest T bits.

When the instruction stream uses a plurality of memory banks, a predetermined value to indicate an instruction, which the address sequentially fetches, is added to the instruction address, R bits higher than the lowest T bits are extracted from the added address, and the extracted bits are supplied to the memory banks to be concurrently used. The predetermined value may be variously set depending on the implementation. In the case where a bit width of an instruction address (IA1 to IA3) is set to 12 bits, and when focusing on the instruction stream 2, higher 10 bits than the lowest 2 bits are extracted and the 10 bits are supplied to the bank 2 designated by the lowest 2 bits. In addition, to the bank 3, which is to be used concurrently, 10 bits higher than the lowest 2 bits in a value resulting from addition of the memory address and "1" are extracted and supplied to the bank 3 (step S104).

After the processing on the instruction stream with the S-th priority order is terminated, the temporary variable S is incremented to process the instruction stream with the S+1-th priority order (step S105).

Next, it is determined whether or not the temporary variable S exceeds the number of instruction streams. Here, the fact that the temporary variable S exceeds the number of instruction streams represents the processing on all the instruction streams is terminated. Therefore, the operation of allocating the instruction addresses of the instruction streams to the memory banks is finished and the instructions are fetched from the memory banks (Yes in step S106). On the other hand, the fact that the temporary variable S is smaller than the number of the instruction streams represents processing is not performed on some instruction streams. Accordingly, the processing is repeated from step S103 (No in step S106).

By executing the flowchart of FIG. 7, in the case where the parameters in FIG. 6 are set, the instruction stream 2 with the highest priority order utilizes two memory banks from the bank 2 to the bank 3 which are designated by the instruction address (IA2) of the instruction stream. That is, an address generated from IA2 is supplied to each of the bank 2 and bank 3. At this point, the banks 1 and 4 are not occupied, and an address generated from the instruction stream 3 with the second highest priority order is supplied to the bank 4, and at last, an address generated from the address (IA4) of the instruction stream 4 is supplied to the bank 1.

As described above, according to the exemplary embodiment, using instruction cache 102 containing a plurality of banks, an instruction of another instruction stream can be fetched. Since a memory bank which is not used in a cycle is utilized to fetch an instruction of another instruction stream, the use of the instruction fetch band width of the instruction cache 102 can be maximized. In addition, because a plurality of instruction streams share the instruction cache 102 which is small in the number than the instruction streams, the number in the instruction cache 102 need not be increased to match the number of the instruction streams. Thus, instruction fetching for a plurality of instruction streams can be realized at a low cost and the use of the instruction fetch band width is maximized.

Example 1

Figure 8:
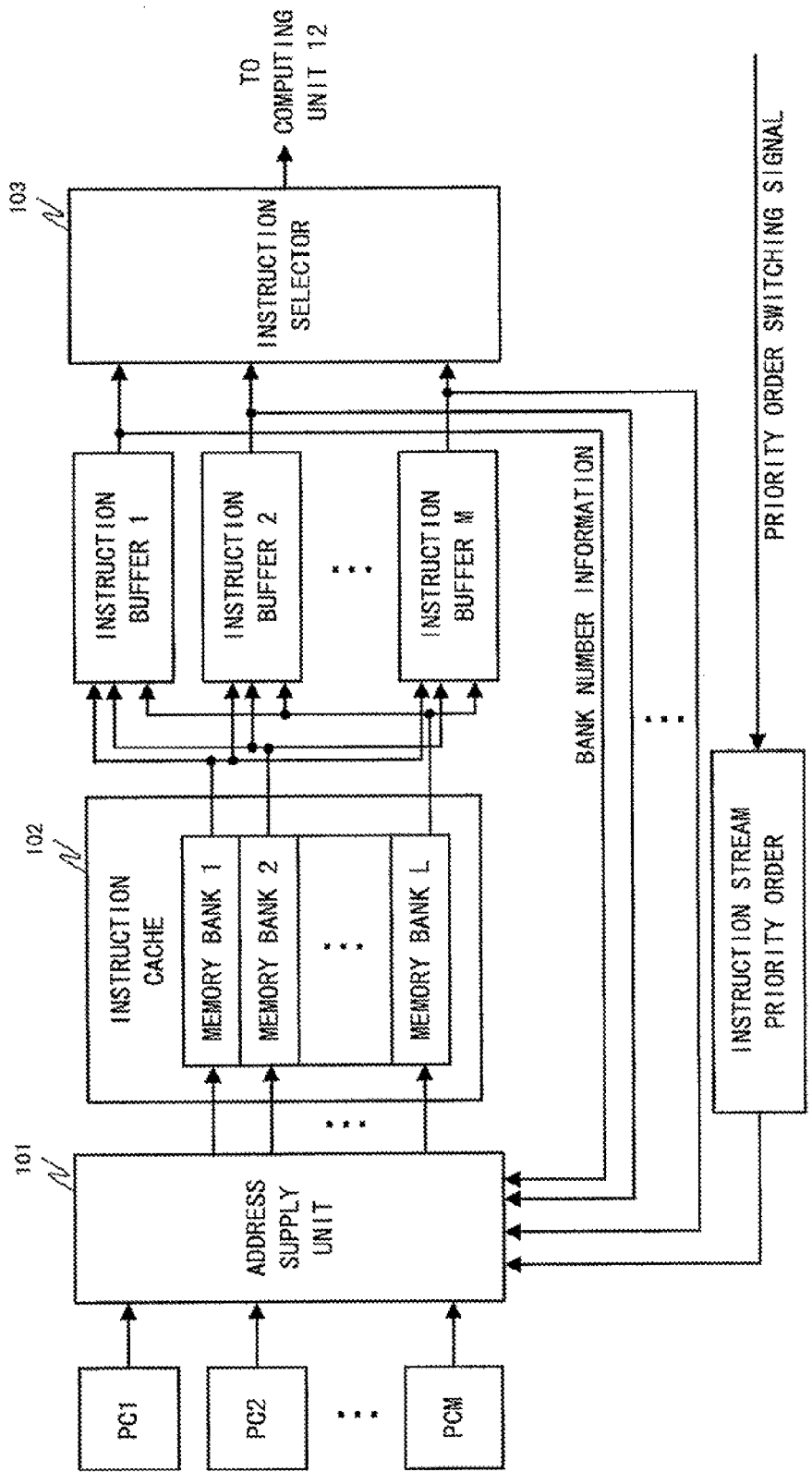
FIG. 8 is a block diagram showing an entire configuration according to an example 1 of the invention.

A block diagram of a VLIW processor with which the invention is implemented is shown in FIG. 8. This shows an example of the embodiments of the invention, and the exemplary embodiments of the present invention will not limited in any way to the example described below, and the various embodiments are possible within the scope of the technical idea of the invention.

FIG. 8 is the block diagram of the VLIW processor which executes very long instruction words of M instruction streams. The very long instruction word contains, as shown in FIG. 5, up to K instructions and information (bank number information) indicating the number of memory banks to be used in the next cycle of instruction fetching.

The VLIW processor shown in FIG. 8 includes program counters (PC1 to PCM), an instruction cache 102, an instruction selector 103, and an address supply unit 101.

PC1 to PCM function as program counters to manage the instruction streams. The instruction cache 102 includes L memory banks which can fetch up to K instructions. The instruction buffers I to M function as instruction buffers to store the fetched very long instruction words from the instruction cache 102. The instruction selector 103 selects an instruction to be executed from the instruction buffers and supplies the selected instruction to the computing unit.

The address supply unit 101, based on the bank number information contained in the very long instruction words of the instruction buffers and the instruction stream priority order, selects an instruction address from the program counters and supplies the instruction for each memory bank.

FIG. 8 shows an example in which the exemplary embodiment of the present invention shown in FIG. 4 is practically implemented with the VLIW processor; therefore, lots of components are common between FIG. 4 and FIG. 8, and have common functions. Thus, an explanation will be given on the difference between FIG. 4 and FIG. 8 in detail.

Firstly, instruction addresses 1 to M in FIG. 4 are represented as the program counters (PC1 to PCM) in FIG. 8. In a typical processor, to control an instruction stream, a program counter to indicate a current instruction address in a program is used. Thus, at the time when instruction fetching from the location indicated by the program counter is finished, it is updated to the address which indicates where the next instruction is stored.

Next, in FIG. 8, the instruction buffers (instruction buffers 1 to M) storing the fetched very long instruction words for the instruction streams and the instruction selector 103 selecting an instruction to be executed from the very long instruction words stored in the instruction buffers are added. Depending on the implementation of the processor, the very long instruction words of the instruction streams concurrently fetched may not be executed concurrently, due to competition between computing units or the like. In such a case, such a configuration is possible that the very long instruction words are once stored in the instruction buffers, and then, the instruction selector selects an instruction to be executed from the instruction buffers and supplies the instruction to a computing unit.

In the present example, the configuration in which all the very long instruction words fetched are once stored in the instruction buffers and an instruction is selected from the instruction buffers is employed; however, the configuration is not so limited. For example, such a manner is possible that the very long instruction words fetched are analyzed, instructions which can be simultaneously executed are supplied to the computing unit, and merely instructions which cannot be executed are stored in the instruction buffers. In addition, in the case where a location of a memory bank to store the fetched instruction and a type of the computing unit correspond one-to-one, concurrently fetched instructions can be executed concurrently. Thus, the instruction buffers and the instruction selector 103 are not required. When the same number of computing units as the number of instructions fetched are provided and all the computing units can execute all the instructions, the instruction buffers and the instruction selector 103 are not required.

Hereinafter, to be described is operation of the instruction selector 103 in the case where not all the fetched instructions can be executed simultaneously. Various manners of implementing the instruction selector 103 are possible. An example thereof will be cited hereinafter; however, the exemplary embodiments of the invention will not be limited in any way to the example below, and various methods are possible within the scope of the technical idea of the invention.

First, implementation (hereinafter, this implementation is referred to as C1) of dime-divisionally selecting an instruction stream to be executed based on the priory order of the instruction stream to be executed is possible.

In such a case, various implementation is possible as a method of determining the priority order. For example, implementation (C1-1), using round-robin which sequentially selects an instruction buffer, is possible. Implementation (C1-2) in which a counter to count the number of cycles at which the instruction is not fetched for each instruction buffer is provided, and the instruction stream having the longest not-selected cycles is selected is possible.

Implementation (C1-3) in which each instruction stream is selected at given intervals is also possible.

In addition, such implementation is possible that the priority order in the above implementation is controlled by a control signal given from the outside of the processor, an instruction to set or change the instruction selector priority order, or an instruction selector priority order flag, which is provided as a partial field in the very long instruction word fetched in the previous cycle.

Next, implementation of selecting instructions concurrently from a plurality of instruction streams is possible (hereinafter, this implementation is referred to as C2). In comparison with implementation C1, implementation C2 can utilize the computing units effectively; however, the hardware for controlling grows larger.

For example, a method of selecting an computing unit for execution in descending order of the priority order is possible (C2-1). Such implementation is possible that the priority order in this case is controlled by a control signal from the outside of the processor, an instruction to set or change the instruction selector priority order, or an instruction selector priority order flag, which is provided as a partial field in the very long instruction word fetched in the previous cycle.

Such implementation (C2-2) is also possible that a very long instruction word in each instruction stream is divided in units of instruction, and a combination to maximize the number of computing units concurrently utilized is realized.

As in the present example, when using the instruction buffers, some difference will be generated in the operation of the address supply unit 101 from the operation flow shown in FIG. 7. Hereinafter, such difference will be described.

Figure 9:
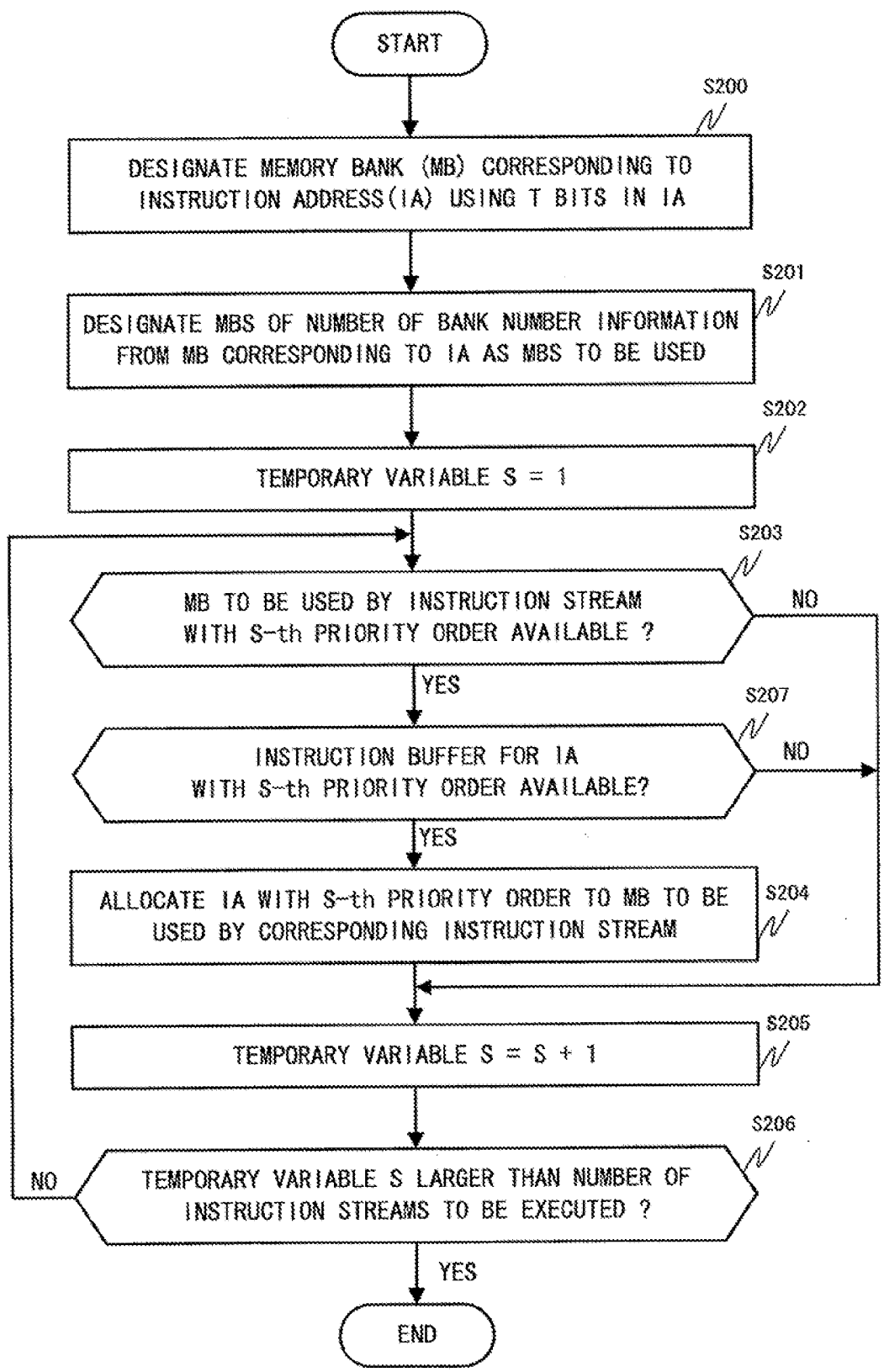
FIG. 9 is a flowchart showing an operation according to the example 1 of the invention.

The operation flow of the address supply unit 101 in the case where the instruction buffers are provided is shown in a flowchart of FIG. 9.

In the present example, the operation in the flowchart is realized by hardware; however, the operation may be realized by software. Moreover, the operation may be realized by cooperation between hardware and software.

Hereinafter, the operation flow of the address supply unit 101 in the case where the instruction buffers are provided will be described with reference to FIG. 9.

First, some steps in FIG. 9 (steps S200 to S206) are correspond to some steps in FIG. 7 (steps S100 to S106) and the same operation is performed. The difference between FIG. 7 and FIG. 9 is in S207, which is inserted between S203 and S204.

Next, operation of S207 will be described hereinafter. If the instruction buffers are not provided, the address supply unit 101 may generate an instruction address to be supplied to each memory bank from the instruction addresses of the program counters of all the instruction streams in execution. However, when the instruction buffers are provided, there may be a case in which a very long instruction word fetched in the previous cycle has not been selected and stored in an instruction buffer. In such a case, if a very long instruction word of the corresponding instruction stream is newly fetched, the very long instruction word cannot be stored in the instruction buffer and the instruction fetch band width will be used in vain.

Accordingly, in the case where the very long instruction word fetched in the previous cycle is present in the instruction buffer, the address supply unit 101 does not supply an address generated from the instruction address of the corresponding instruction stream to the memory banks, regardless of the instruction stream priority order (step S207).

Example 2

Figure 10:
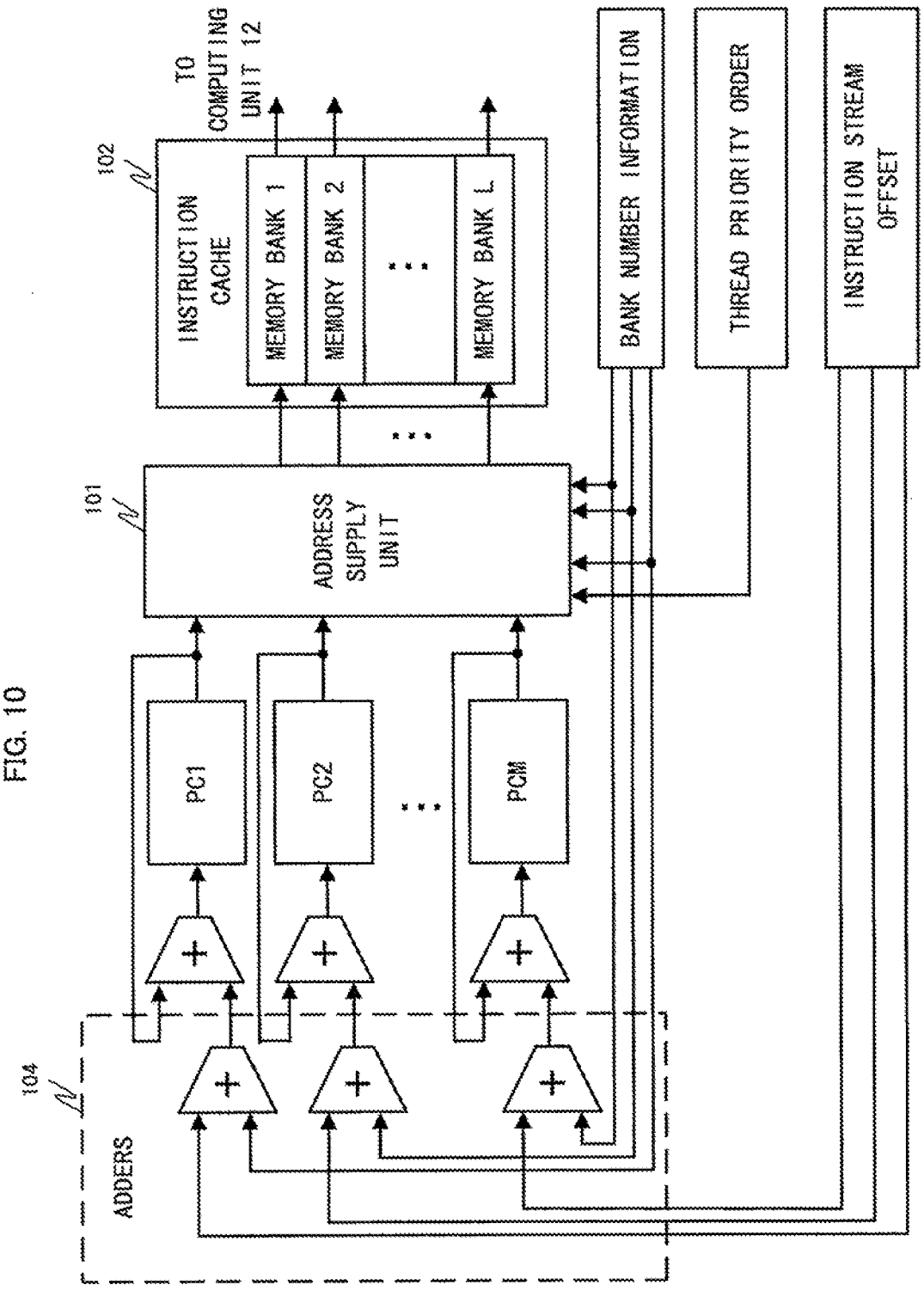
FIG. 10 is a block diagram showing an entire configuration according to an example 2 of the invention.

With reference to FIG. 10, another exemplary embodiment of the invention will be explained. In the example 2, a programming unit and a compiler for realizing the invention more effectively will be described in detail.

FIG. 10 shows a processor to execute plurality of instruction streams, which supports realization with the programming unit and the complier by hardware.

An example to embody an exemplary embodiment of the invention will be described. Therefore, the exemplary embodiments of the invention will not be limited in any way to the example below, and various embodiments are possible within the scope of the technical idea of the invention.

Figure 11:
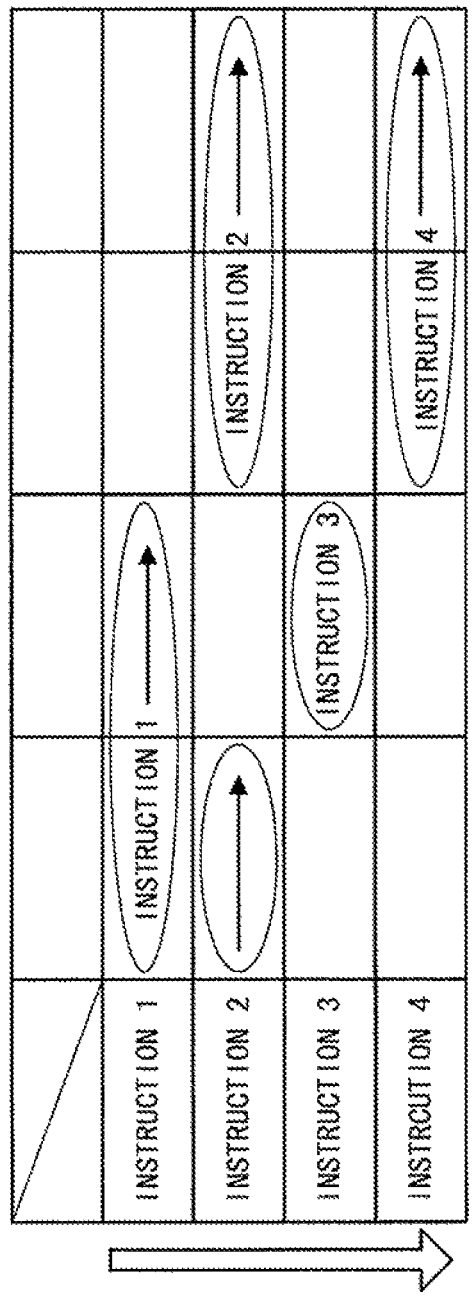
FIG. 11 is a common arrangement plan of a very long instruction word in memory banks.

First, necessity for the programming unit and the compiler will be described. Herein, such setting that the number of instruction streams M to be executed is 2 and the number of memory banks L is 4 will be assumed, by way of example. In addition, a case will be assumed where very long instruction words of two instruction streams in certain 4 cycles are allocated to instruction addresses that uses memory banks as shown in FIG. 11. The description will be given on the case where, regarding the instruction stream priority order, an instruction stream A is always given higher priority order than an instruction stream B.

The usage of the memory banks shown in FIG. 11 correspond to allocation assumed in the case where the programming unit and the compiler for the typical processor are used. Since each of the very long instruction words IA1 to IA4, is located to a neighboring instruction address to the next, the memory banks to be used in each cycle will be shown as in FIG. 11.

In the setting above, the two instruction streams will be executed. As shown in FIG. 12, in the first cycle, since the instruction streams A and B respectively uses the memory banks 1 and 2, merely IA1 having higher priority order is subjected to instruction fetching.

In the next cycle, since the instruction streams A and B are respectively to use the memory bank 1, IA2 of higher priority order is subjected to instruction fetching.

Similarly, when instruction fetching is performed entirely on the instruction streams A and B, since competition is occurred in a memory bank to be used by the instruction streams A and B, and instruction fetching is performed on the instruction stream A of higher priority order, and then, instruction fetching is performed on the instruction stream B.

Thus, as shown in FIG. 12, to terminate instruction fetching entirely on the instruction streams A and B, 8 cycles are required. In FIG. 12, IA indicates a very long instruction word of the instruction stream A and IB indicates a very long instruction word of the instruction stream B.

As described above, in the case where the programming unit and the compiler for the typical processor are used, there may be a case in which the performance of the processor proposed with the present invention cannot effectively utilized. Thus, the programming unit, the complier and the processor shown in FIG. 10 which supports the programming unit and the compiler are required.

To avoid the above described case, the instruction addresses of the very long instruction words of the instruction streams are required to be adjusted so that the very long instruction words of the respective instruction streams use different memory banks as mush as possible, to minimize the competition between memory banks to be used by the instruction streams.

Hereinafter, the means of realizing and implementing will be described. It should be noted that various implementation will be possible. Hereinafter, an example will be described; however, the embodiments of the invention will not be limited to the example below and various methods are possible within the technical scope of the invention.

First, as an implementation example to adjust instruction addresses, such implementation is possible that the programming unit which can designate the number of memory banks each instruction stream uses is provided. According to the implementation, when the programming unit is provided and the program is compiled, combination of instructions simultaneously executed for the instruction streams, and instruction addresses of the very long instruction words of the instruction streams are adjusted so that the designation will be reflected. Regarding the above example, such setting can be made that the number of usable memory banks is set to 2 for both of the instruction streams A and B; therefore, at least once in every two cycles, the instructions of the both instruction streams A and B can be fetched concurrently.

Next, as another implementation example to adjust instruction addresses, such implementation is possible, that the programming unit which can designate the memory banks each instruction stream uses is provided. According to the implementation, when the programming unit is provided and the program is compiled, the instruction addresses of the very long instruction words of the instruction streams are adjusted so that the designation will be reflected. Regarding the above example, such setting can be made that the instruction stream A uses the banks 1 and 2 as much as possible and the instruction stream B uses the banks 3 and 4 as much as possible. The usage of the memory banks by the instruction stream A and the instruction stream B in this case is shown in FIG. 13.

Figure 13:
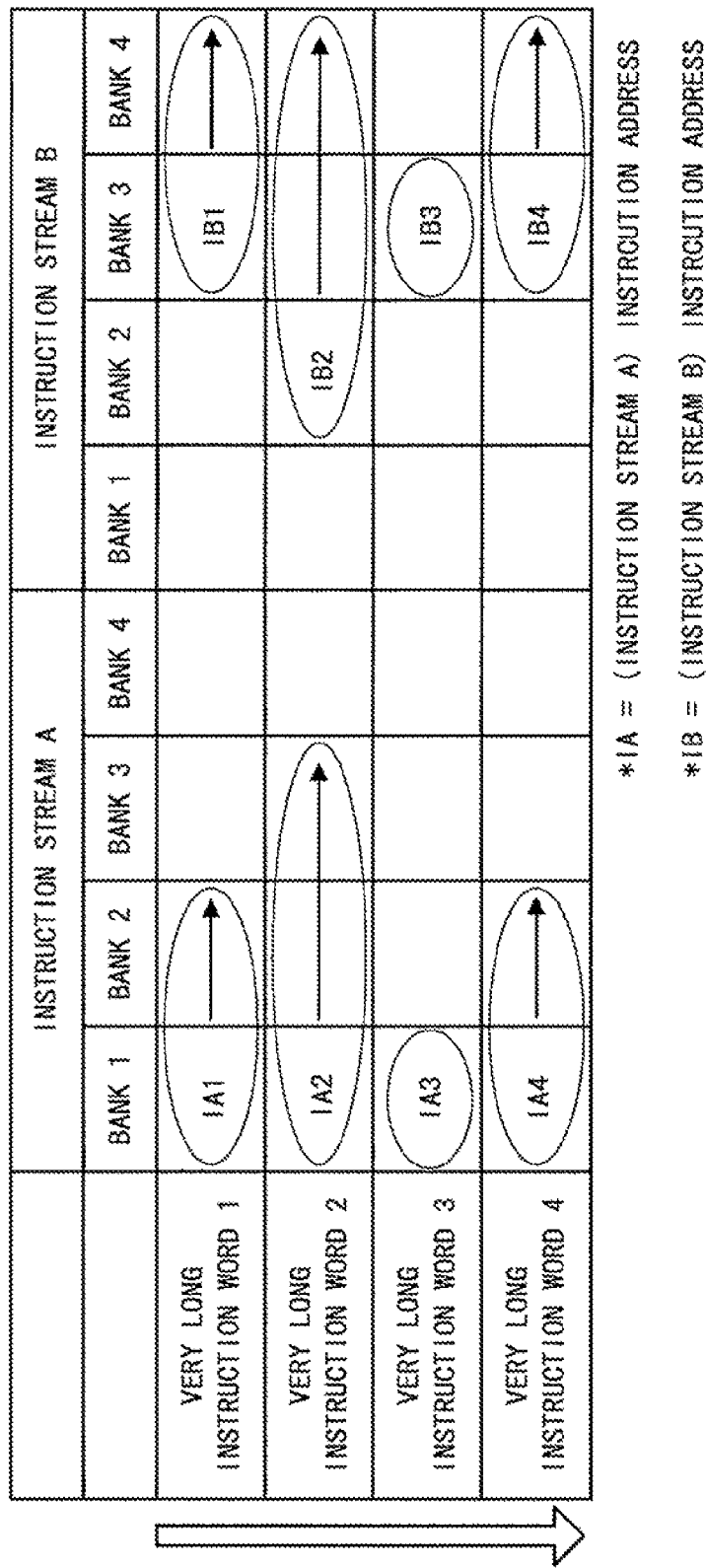
FIG. 13 is an arrangement plan of a very long instruction word proposed in the memory banks.
Figure 14:
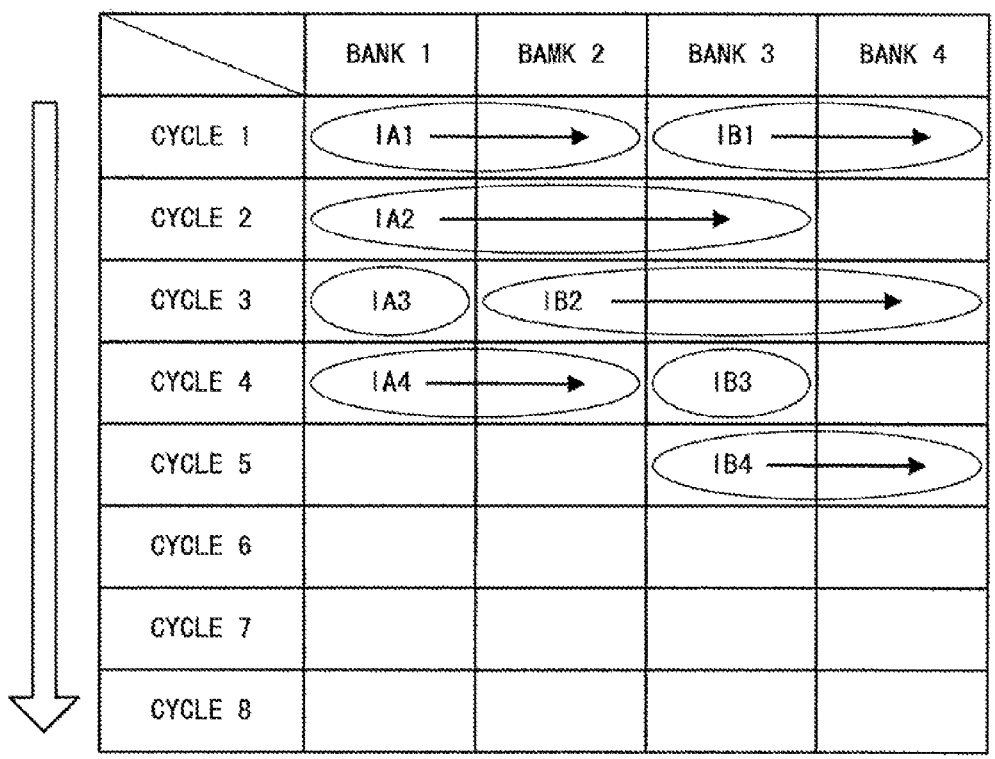
FIG. 14 is an exemplary cycle chart according to a case in which processing is executed at the arrangement of the very long instruction word proposed in FIG. 13.

Assume that the two instruction streams are executed in the instruction location shown in FIG. 13. In the first cycle, memory banks to be used by the instruction stream A and the instruction stream B are not overlapped and the IA1 and IB1 are concurrently fetched. In the next cycle, the instruction streams A and B are respectively to use the memory banks 1 and 3; therefore, merely IA2 of the instruction stream A of higher priority order is fetched. Similarly, after instruction fetching is entirely performed on the instruction streams A and B, a result as shown in FIG. 14 is provided and it will be understood that 5 cycles are necessary to finish instruction fetching entirely on the instruction streams A and B. According to the result, by utilizing the instruction location shown in FIG. 13, instruction fetching can be executed faster by 3 cycles in comparison with the conventional instruction location shown in FIG. 12.

Hereinafter, a processor which supports effective realization of the program according to the instruction location shown in FIG. 13 by hardware and executes a plurality of instruction streams will be described.

Firstly, description will be given on a case in which the program according to the instruction location shown in FIG. 13 is executed in a typical processor. In the program according to the instruction location shown in FIG. 13, instruction addresses of the very long instruction words to be fetched are not sequential. Therefore, for the execution in the typical processor, execution of a jump instruction is necessary for each very long instruction word. Thus, even though the competition in the memory banks can be suppressed, the execution performance of the instruction streams is largely decreased. Accordingly, the hardware to support the effective realization of the program according to the instruction location shown in FIG. 13 is required. The VLIW processor to which the above implementation is attached and which executes a plurality of instruction streams is shown in FIG. 10.

The VLIW processor shown in FIG. 10 includes the VLIW processor shown in the example 1, and the above described hardware mechanism attached thereto. Here, in FIG. 8 of the example 1 and in FIG. 10, except the program counters (PC1 to N), the same components having the same names have the same functions, and hereinafter, the description will be given on the other components.

In FIG. 10, mechanism, which is omitted in FIG. 8, to update the program counters is shown. First, description will be given on the program counters and the mechanism to update. It should be noted that in FIG. 10, the program counters (PC1 to N) express merely registers to store the instruction addresses of the very long instruction words to be fetched in the current cycle.

In the typical processor, when instruction fetching is performed with the instruction address indicated by the program counter, a PC update value based on the number of instructions fetched is added to the program counter value; and thus, the program counter is updated by the additional value. FIG. 10 shows a case in which the number of the instructions fetched have one-to-one correspondence to the number of banks to be used, and the bank number information is utilized as the additional value in place of the number of instructions fetched.

On the other hand, in FIG. 10, as well as the bank number information, an offset value for each instruction stream (instruction stream offset) is added to the program counter. By further adding the instruction stream offset, the program according to the instruction location shown in FIG. 13 can be effectively performed.

Hereinafter, taking the instruction stream A of FIG. 13 as an example, description will be given on the instruction stream offset. To fulfill the instruction location of the instruction stream A shown in FIG. 13, updating the program counter (instruction address) needs to be performed as follows. In the instruction stream in FIG. 13, to acquire, after IA1 is fetched, an instruction address indicating IA2, offset of 2 is necessary to be added to IA1 in addition to the bank number information (2, in this case). Similarly, to acquire IA3 and IA4, offsets of 1 and 3 are added respectively. In the configuration of FIG. 10, the above values are supplied by the instruction stream offset and used to generate the next program counter value for the instruction stream A.

The above operation is supported with hardware utilizing the instruction offset in FIG. 10, and adders 14 which are surrounded by dashed lines in FIG. 13. The instruction stream offset supplies the offset of the above example to each instruction stream. The adders 14 surrounded by the dashed lines add the respective PC update values based on the number of instructions fetched for the respective instruction streams and the offset values supplied from the instruction stream offset, and supply the additional values to be added to the program counters.

In the example of FIG. 10, since the PC update value based on the number of instructions fetched for each instruction stream is equivalent to the number of the banks to be used by each instruction stream, the bank number information is used as the PC update value. In practical implementation, the bank number information is not necessarily used as the PC update value. For example, such implementation is possible that two instructions are stored in three memory banks. Another value calculated to update the program counter in the typical processor is used as the PC update value.

Hereinafter, implementation of the instruction stream offset will be described in detail. Various implementation is possible to supply offset for each instruction stream. Hereinafter, one example thereof will be cited; however, the exemplary embodiments of the invention will not be limited in any way to the example below, and various methods are possible within the scope of the technical idea of the present invention.

First, by the programming unit and the compiler, an offset value to be stored in the instruction stream offset is generated. Taking the instruction A in FIG. 13 as an example, the programming unit sets so that the instruction stream A uses the banks 1 and 2 as much as possible. Moreover, it is set so that the instruction stream B uses the banks 3 and 4 as much as possible. The compiler generates offset for each cycle of the instruction stream A. In the example, 2 is generated for IA1, 1 and 3 are generated respectively for IA2 and IA3.

Next, description will be given on means for supplying the generated offset to the instruction stream offset in FIG. 10. As the supplying means, such implementation is possible that the instruction stream offset to be supplied to each instruction stream is fixed. A register storing the offset is provided for each instruction stream, and the register is utilized as the instruction stream offset. Such implementation is possible that a value to be set in the register is controlled based on an instruction offset control signal from the outside of the processor, an instruction offset changing instruction to set or change the register, or an instruction offset changing flag, which is provided as a partial field of the very long instruction word fetched in the previous cycle.

Such implementation is possible that an instruction offset setting signal from the outside of the processor, an instruction offset setting instruction to set or change the register, or an instruction offset changing flag, which is provided as a partial field of the very long instruction word fetched in the previous cycle, is supplied as the instruction stream offset.

Such implementation is also possible that a dedicated memory to store the instruction stream offset is provided for each instruction stream. The memory is referred at the instruction address of each instruction stream and stores the instruction stream offset for the corresponding instruction stream. In addition, such implementation that the contents of the memory is set before the program activation, or updated as cache is possible. When implementing as the cache, such implementation is possible that necessary hardware cost is reduced by utilizing the cache control mechanism of the instruction cache 102 in FIG. 4.

According to the exemplary embodiments of the present invention, a memory bank to be used by each instruction stream is designated based on an instruction address of the instruction stream and the number of memory banks to be used, and instruction fetching is determined so that the maximum possible number of the memory banks are used. Therefore, execution of a plurality of instruction streams become possible, suppressing hardware cost to be attached, without a plurality of instruction caches corresponding to the number of the instruction streams to be executed.

For example, assuming that 4 memory banks are used and up to 4 instructions can be fetched per cycle. Also assuming instruction counts of an instruction sequence to be executed for the instruction stream A are 3, 2, 1, and 2, and instruction counts of an instruction sequence to be executed for the instruction stream B are 1, 2, 3, and 2. In this case, according to the conventional technique, the instruction streams A and B are time divisionally-divided, and 8 cycles are necessary to fetch the instructions of both instruction streams. On the other hand, according to the exemplary embodiment of the invention, in each cycle, instruction streams are selected to maximize the number of memory banks to be used and the instructions of the instruction streams are fetched. Therefore, in the case where the instructions of the instruction stream A and the instruction stream B are to use different memory banks, the instructions of both of the instruction stream A and the instruction stream B can be fetched in one cycle, allowing to finish instruction fetching on both of the instruction streams for 4 cycles at minimum. As above, the band width of instruction fetching can be effectively utilized and higher performance can be achieved.

It should be noted that the processor to execute a plurality of instruction streams at low cost according to the exemplary embodiments of the invention can be realized by hardware, software, or cooperation thereof.

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

REFERENCE SIGNS LIST

1: processor
2: program memory
3: data memory

11: instruction supply unit
12: computing unit
13: register unit
101: address supply unit
102: instruction cache
103: instruction selector
104: adders

The invention claimed is:

1. A processor executing a very long instruction word containing a plurality of instructions, comprising an address supply unit configured, when the processor fetches concurrently the very long instruction words of up to M instruction streams, from N instruction caches including a plurality of memory banks to store the very long instruction words of the M instruction streams, to:
set instruction priority order for each of the instruction streams;
designate a memory bank to be used by each of the instruction streams from the memory banks based on bank number information, which indicates a number of memory banks each instruction stream uses, and an instruction address of each of the instruction streams;
determine a memory bank to be used in descending priority order based on the instruction stream priority order when a plurality of instruction streams are to use a same memory bank; and
supply an instruction address of a corresponding instruction stream to the determined memory bank,
the very long instruction words of the M instruction streams being allocated to different memory banks of the plurality of memory banks, respectively,
the instruction stream priority order being set to a fixed value for each of the instruction streams, and
the fixed value being set and changed based on one of an external instruction stream priority order control signal, a changing instruction for instruction priority order, and a instruction stream priority changing flag, which is included in a very long instruction word fetched in a previous cycle as a partial field thereof.

2. The processor according to claim 1, wherein the bank number information is included in the very long instruction word, which is fetched in a previous cycle as a partial field thereof.

3. The processor according to claim 1, wherein the bank number information includes a fixed number for first instruction fetching for each of the instruction streams.

4. The processor according to claim 1, wherein the bank number information includes, when the very long instruction word includes a branch instruction, a plurality of items corresponding to branch results as a partial field of the very long instruction word, which is fetched in a previous cycle.

5. The processor according to claim 4,
when the very long instruction word includes a branch instruction,
an item of the bank number information and a fixed number are used as the bank number information in a case where the branch is true or false,
the item of the bank number information is included in the very long instruction word, which is fetched in a previous cycle as a partial field thereof, and
the fixed number includes a numeric value to be changed in accordance with an external control signal or a changing instruction for bank number information.

6. The processor according to claim 1 wherein the bank number information includes a fixed number for each of the instruction streams and the fixed number is changed based on an external bank number control signal or a changing instruction for bank number information.

7. The processor according to claim 1 wherein the bank number information is stored in a memory provided for each of the instruction streams, and the memory is referred based on an instruction address of a corresponding instruction stream.

8. The processor according to claim 1 wherein
the instruction stream priority order is determined by a round robin method, and an instruction stream to accept a highest priority order and order of changing the priority order are set and changed based on one of an external control signal, a changing instruction for instruction stream priority order, and an instruction stream priority changing flag, which is included in a very long instruction word fetched in a previous cycle as a partial field thereof.

9. The processor according to claim 1, wherein the instruction stream priority order is changed based on a number of times an instruction of each of the instruction streams is fetched or not fetched.

10. The processor according to claim 9, wherein higher priority order is allocated in increasing order of a number of times an instruction is fetched for each of the instruction streams.

11. The processor according to claim 9, wherein higher priority order is allocated in descending order of a number of times an instruction is not fetched for each of the instruction streams.

12. The processor according to claim 1, wherein a fixed value is allocated as the instruction stream priority order to a selected instruction stream, and the instruction stream priority order of remaining instruction streams are determined in accordance with one or combination of a round robin method, an instruction stream priority flag, which is included in a very long instruction word fetched in a previous cycle as a partial field thereof, such a manner that higher priority order is allocated in increasing order of a number of times an instruction is fetched for each of the instruction streams, and such a manner that higher priority order is allocated in descending order of a number of times an instruction is not fetched for each of the instruction streams.

13. The processor according to claim 1, further comprising a programming unit or a complier configured to locate an instruction of each of the instruction streams to an instruction address so that overlapping of memory banks to be used by the instruction streams is minimized.

14. The processor according to claim 1, further comprising a programming unit or a compiler configured to designate a number of usable memory banks for each of the instruction streams.

15. The processor according to claim 1, further comprising a programming unit or a compiler configured to designate a usable memory bank for each of the instruction streams.

16. The processor according to claim 1, when a very long instruction word of each of the instruction streams is fetched, a value resulting from addition of the instruction address, a value corresponding to a length of the very long instruction word fetched and an instruction offset of a corresponding instruction stream is used as an instruction address of the corresponding instruction stream in a next cycle.

17. The processor according to claim 16, wherein the instruction stream offset is set by the programming unit or the compiler.

18. A method of executing a very long instruction word containing a plurality of instructions using a processor, when fetching concurrently the very long instruction words of up to M instruction streams, from N instruction caches including a plurality of memory banks to store the very long instruction words of the M instruction streams, the method comprising:

setting instruction priority order for each of the instruction streams;

designating a memory bank to be used by each of the instruction streams from the memory banks based on bank number information, which indicates a number of memory banks each instruction stream uses, and an instruction address of each of the instruction streams;

determining a memory bank to be used in descending priority order based on the instruction stream priority order when a plurality of instruction streams are to use a same memory bank; and supplying an instruction address of a corresponding instruction stream to the determined memory bank, the very long instruction words of the M instruction streams being allocated to different memory banks of the plurality of memory banks, respectively, the instruction stream priority order being set to a fixed value for each of the instruction streams, and the fixed value being set and changed based on one of an external instruction stream priority order control signal, a changing instruction for instruction priority order, and a instruction stream priority changing flag, which is included in a very long instruction word fetched in a previous cycle as a partial field thereof.

19. A non-transitory computer readable medium storing a program for causing a computer to function as a processor executing a very long instruction word containing a plurality of instructions, the program causes the computer, when fetching concurrently the very long instruction words of up to M instruction streams, from N instruction caches including a plurality of memory banks to store the very long instruction words of the M instruction streams, the processor further comprises an instruction supply unit configured to:

set instruction priority order for each of the instruction streams;

designate a memory bank to be used by each of the instruction streams from the memory banks based on bank number information, which indicates a number of memory banks each instruction stream uses, and an instruction address of each of the instruction streams;

determine a memory bank to be used in descending priority order based on the instruction stream priority order when a plurality of instruction streams are to use a same memory bank; and supply an instruction address of a corresponding instruction stream to the determined memory bank, the very long instruction words of the M instruction streams being allocated to different memory banks of the plurality of memory banks, respectively, the instruction stream priority order being set to a fixed value for each of the instruction streams, and the fixed value being set and changed based on one of an external instruction stream priority order control signal, a changing instruction for instruction priority order, and a instruction stream priority changing flag, which is included in a very long instruction word fetched in a previous cycle as a partial field thereof.

* * * * *